(12) United States Patent
Hsu et al.

(10) Patent No.: US 7,698,784 B2
(45) Date of Patent: Apr. 20, 2010

(54) HINGE ASSEMBLY FOR DISPLAY MONITOR

(75) Inventors: Sheng-Cheng Hsu, Taipei Hsien (TW); Pu Luo, Shenzhen (CN); Jin-Shu Xue, Shenzhen (CN); Chao-Yang Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 691 days.

(21) Appl. No.: 11/556,404

(22) Filed: Nov. 3, 2006

(65) Prior Publication Data
US 2008/0034543 A1  Feb. 14, 2008

(30) Foreign Application Priority Data
Jul. 7, 2006   (CN) .................... 2006 1 0061569

(51) Int. Cl.
*E05C 17/64* (2006.01)
(52) U.S. Cl. .......................................... 16/337; 16/340
(58) Field of Classification Search ................ 16/337, 16/338, 340, 374; 248/299.1, 299.2, 917–923; 361/679.27, 679.11, 679.12; 348/373, 794, 348/333.06; 455/575.3, 575.4, 575.1, 550.1, 455/90.3
See application file for complete search history.

(56) References Cited

U.S. PATENT DOCUMENTS 5,334,354 A * 8/1994 Johnston et al. ............ 422/104
6,018,847 A * 2/2000 Lu ................................ 16/337
6,163,928 A * 12/2000 Chung .......................... 16/342
6,539,582 B1 * 4/2003 Chae ............................. 16/340
6,666,422 B1 * 12/2003 Lu et al. .................... 248/291.1
6,671,928 B2 * 1/2004 Huang .......................... 16/340
6,867,962 B2 * 3/2005 Cho et al. ............... 361/679.27
2003/0221288 A1 * 12/2003 Kim et al. ..................... 16/337
2005/0108854 A1 * 5/2005 Lee et al. ....................... 16/340
2006/0191104 A1 * 8/2006 Cho et al. ...................... 16/340

FOREIGN PATENT DOCUMENTS

| CN | 01260991.9 | 9/2001 |
| CN | 03119601.2 | 3/2003 |
| TW | 484716 | 4/2002 |
| TW | 584298 | 4/2004 |

* cited by examiner

*Primary Examiner*—Chuck Y. Mah
(74) *Attorney, Agent, or Firm*—Clifford O. Chi

(57) ABSTRACT

An exemplary hinge assembly (300) for use in a flat display monitor includes a support member (10), a rotational base (20) and a pivot mechanism (30) for rotatably connecting the rotational base to the support member. The rotational base includes a fixing board (22) and a side board (24) disposed at an end of the fixing board, the side board defining an engaging hole (242) and forming an inwardly bent portion (240) at a distal end edge thereof. The support member includes an extending seat (16) defining a round pivoting hole (1601), and a retaining portion (161) extending from an exterior side of the extending seat. The retaining portion of the side board is configured for blocking the inwardly bent portion of the side board so that a range of rotation of the rotational base relative to the support member is between a first utmost position and a second utmost position.

19 Claims, 5 Drawing Sheets

HINGE ASSEMBLY FOR DISPLAY MONITOR

BACKGROUND OF THE INVENTION

1. Field of the Invention

The present invention generally relates to hinge assemblies and, particularly, to a hinge assembly typically used for a flat display monitor.

2. Discussion of the Related Art

With the widespread use of a variety of computers, display devices configured for use with such computers come in a variety of sizes, shapes, and weights. In general, a typical cathode-ray tube (CRT) monitor includes a display panel for displaying an image, a vacuum tube coupled to the rear of the display panel, and an electron gun coupled to the rear of the vacuum tube. This configuration is the predominant factor that determines the total volume and final weight of the CRT monitor. In addition, the CRT monitor has a significant drawback in that a user is easily fatigued when viewing the CRT monitor over several hours due to its low image quality. Because of this problem alone, many users have switched from a CRT monitor to a flat screen display monitor such as a liquid crystal display (LCD) monitor. Such flat display monitors generally offer the advantages of a greatly reduced overall size, reduced weight, and high image quality. Furthermore, flat display monitors may help to overcome space limitations and constrictions through folding over (such as with a laptop computer) or rotating (such as with a desktop monitor) so as to facilitate easy adjustment of the position of the flat display monitor relative to the user.

The rotating or folding-over functions of a flat display monitor are realized with a hinge assembly. A typical hinge assembly includes an L-shaped fixed seat, a pivotal axle, and a number of oiled washers. The fixed seat has a retaining hole defined therein. The pivotal axle is pivotally connected with the fixed seat. The pivotal axle has a retaining shoulder formed at a middle portion thereof, a connecting end portion integrally formed at a first end of the retaining shoulder, and a fixing end portion integrally formed at a second end of the retaining shoulder. The connecting end portion of the pivotal axle extends through a retaining hole of the fixed seat along with the oiled washers, and is fastened in the fixed seat by a fastening piece. The hinge assembly limits a maximum inclination angle of the flat display monitor by means of the retaining hole in the fixed seat. However, in general, a high degree of precision is required in manufacturing the retaining hole, and this tends to increase the cost of manufacturing. In addition, edges of the fixed seat around the retaining hole are liable to be abraded. As a result, the flat display monitor might be rotated beyond the maximum inclination angle, and/or the flat display monitor may not remain stable at the inclination angle selected by a user. Furthermore, during use, a user may need to exert great effort in order to be able to rotate the hinge assembly.

Therefore, a new hinge assembly is desired in order to overcome the above-described shortcomings.

SUMMARY

In one embodiment, a hinge assembly for use in a flat display monitor includes a support member, a rotational base and a pivot mechanism for rotatably connecting the rotational base to the support member. The rotational base includes a fixing board and a side board disposed at an end of the fixing board, the side board defining an engaging hole and forming an inwardly bent portion at a distal end edge thereof. The support member includes an extending seat defining a round pivoting hole, and a retaining portion extending from a side of the extending seat. The retaining portion of the side board is configured for blocking the inwardly bent portion of the side board so that a range of rotation of the rotational base relative to the support member is between a first utmost position and a second utmost position.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present hinge assembly and display monitor. Moreover, in the drawings, like reference numerals designate corresponding parts throughout the several views.

DETAILED DESCRIPTION OF THE EMBODIMENTS

Figure 1:
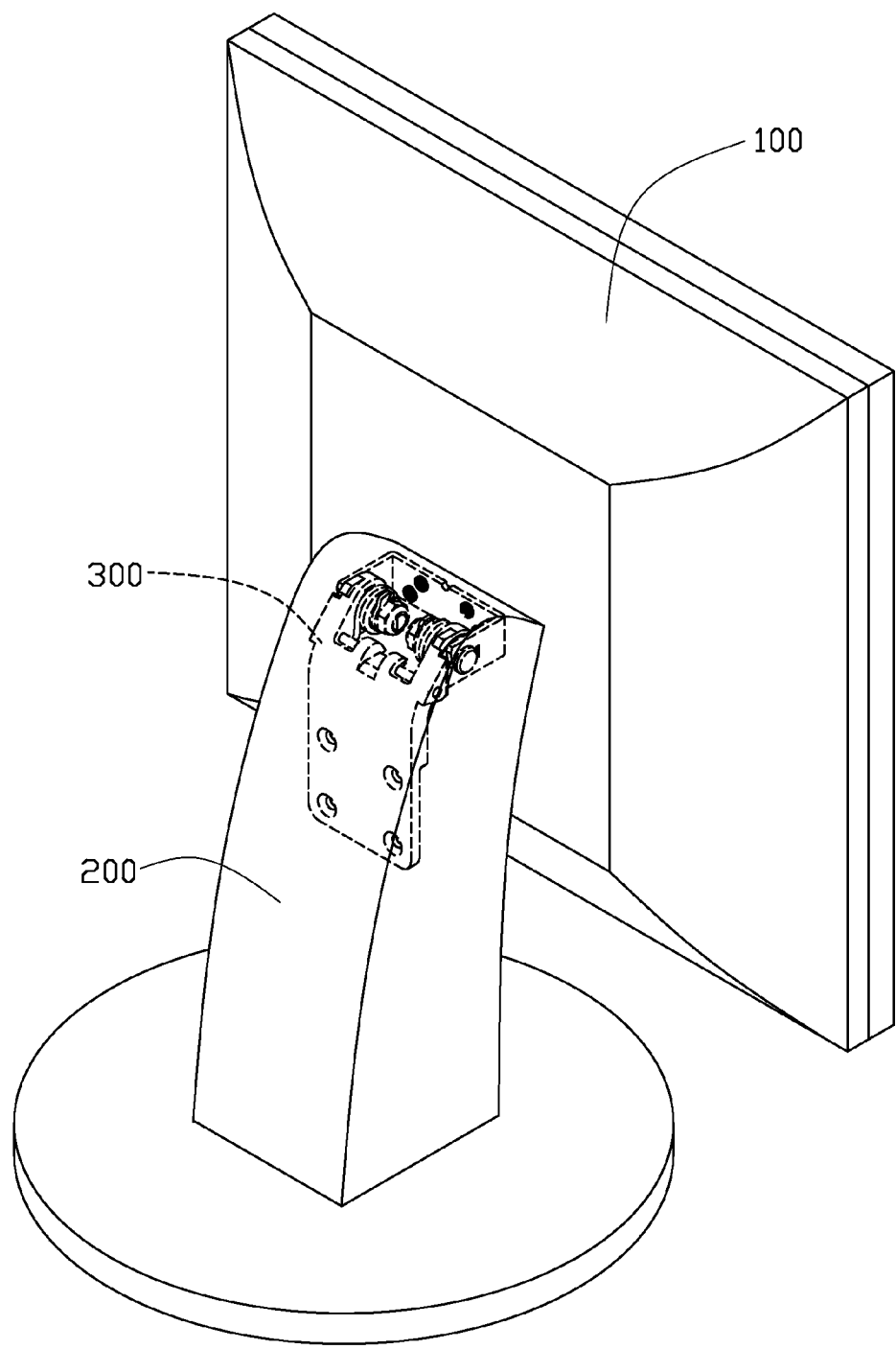
FIG. 1 is an isometric view of a flat display monitor incorporating a hinge assembly (shown in phantom) in accordance with one embodiment of the present invention.

Referring to the drawings in detail, FIG. 1 shows a flat display monitor employing a hinge assembly 300 in accordance with one embodiment of the present invention. The flat display monitor is taken here as an exemplary application, for the purposes of describing details of the hinge assembly 300. It is to be understood that the hinge assembly 300 can be advantageously used in numerous other applications, such as cabinet doors, closed-circuit camera installations, etc. Thus, although the hinge assembly 300 provides particular advantages when used in a flat display monitor, the hinge assembly 300 should not be considered to be limited in scope to uses in the field of flats display monitors. The exemplary flat display monitor herein also includes a display body 100 and a support body 200. The hinge assembly 300 connects the display body 100 to the support body 200 such that the display body 100 can be pivoted relative to the support body 200.

Figure 2:
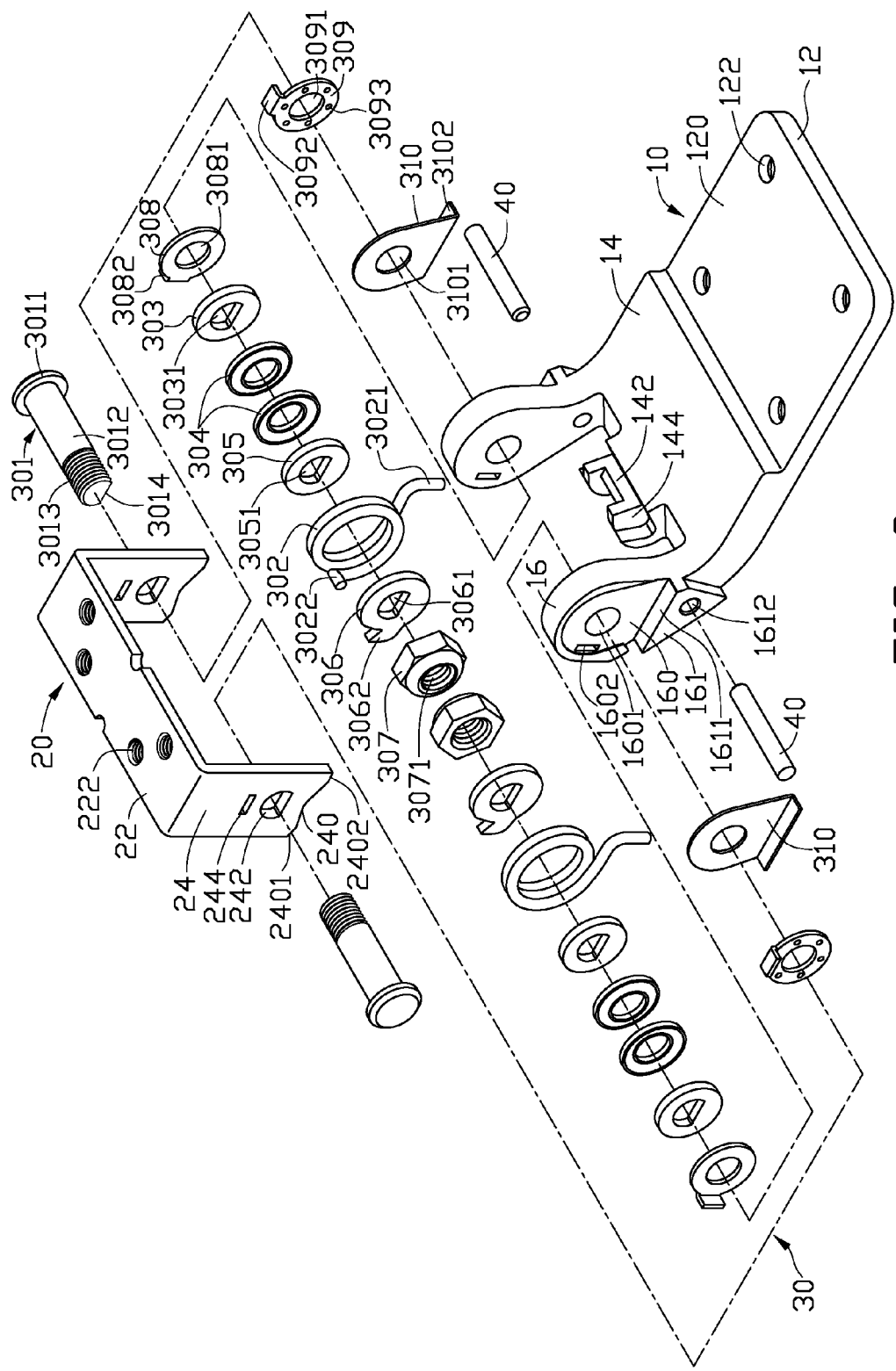
FIG. 2 is an enlarged, exploded, isometric view of the hinge assembly of FIG. 1.

Referring to FIG. 2, the hinge assembly 300 includes a support member 10, a rotational base 20, and two pivot mechanisms 30. The support member 10 is fixed to the support body 200, and the rotational base 20 is fixed to display body 100. The pivot mechanism 30 is used for connecting the support member 10 and the rotational base 20 so that the rotational base 20 can rotate relative to the support member 10.

The support member 10 includes a mounting portion 12, a connecting portion 14, and two extending seats 16. The mounting portion 12 and the connecting portion 14 are substantially board-shaped, with the connecting portion 14 being thicker than the mounting portion 12. The mounting portion 12 has a surface 120, and defines a plurality of mounting holes 122. In this embodiment, there are four mounting holes 122. The support member 10 is mounted to the support body 200 by means of the mounting holes 122. One end of the connecting portion 14 integrally connects with the mounting portion 12, and an opposite end of the connecting portion 14 forms a central protrusion 142. The protrusion 142 defines two fixing slots 144 at two opposite sides thereof respectively, with the fixing slots 144 generally facing toward the surface 120. The extending seats 16 extend from said opposite end of the connecting portion 14, at opposite sides of the protrusion 142 respectively. Each of the extending seats 16 generally slants toward a same direction that is perpendicular to the surface 120. The extending seats 16 are parallel to each other, and are spaced from the protrusion 142. Each of the extending seats 16 includes an assembling portion 160 and a retaining portion 161. The assembling portion 160 is substantially cylindrical, and defines a round pivoting hole 1601 in a centre thereof and a fixing hole 1602 adjacent to a periphery thereof. The round pivoting holes 1601 of the assembling portions 160 are coaxial. The fixing hole 1602 of each assembling portion 160 is rectangular. Each retaining portion 161 extends from an outer side of the corresponding assembling portion 160. In this embodiment, a cross section of the retaining portion 161 is triangular. The retaining portion 161 includes a restricting surface 1611 for restricting a maximum inclination angle of the display body 100. The retaining portion 161 defines a round through hole 1612 in a middle portion thereof, for receiving a corresponding one of two pins 40.

The rotational base 20 includes a fixing board 22, and two opposite side boards 24. The fixing board 22 defines a plurality of threaded assembling holes 222. In this embodiment, there are four assembling holes 222. The rotational base 20 is mounted to the display body 100 by means of the assembling holes 222. The side boards 24 perpendicularly extend from two opposite ends of the fixing board 22 respectively. Each of the side boards 24 forms an inwardly bent portion 240 at a distal end edge thereof. The inwardly bent portion 240 includes a first restricting surface 2401 and a second restricting surface 2402. The first restricting surface 2401 adjoins the second restricting surface 2402. The side board 24 defines an engaging hole 242 and a fixing hole 244. The engaging hole 242 has a keyed shaped. In the illustrated embodiment, the engaging hole 242 is sector-shaped, with an area of the sector being greater than a semicircle. The fixing hole 244 is rectangular.

Each pivot mechanism 30 includes a pivotal shaft 301, a torsion spring 302, a first washer 303, a pair of resilient rings 304, a second washer 305, a limiting washer 306, a fixing piece 307, a first tab washer 308, a second tab washer 309, and a protecting piece 310.

The pivotal shaft 301 is substantially cylindrical, and includes a deformed shaft portion 3012 and an end flange 3011. The flange 3011 is substantially disk-like in shape. The deformed shaft portion 3012 defines a thread 3013 on a distal end portion thereof opposite to the flange 3011. The deformed shaft portion 3012 is flattened along a section of a cylindrical surface area thereof, thus forming a flat surface 3014. Thereby, the thread 3013 is discontinuous. A cross-section of the deformed shaft portion 3012 corresponds to the shape and size of a corresponding one of the engaging holes 242 of the rotational base 20. That is, the deformed shaft portion 3012 can pass through and be fittingly retained in the engaging hole 242 of the rotational base 20.

The torsion spring 302 is helical, and has a first latching end 3021 and a second latching end 3022. The first latching end 3021 is bent, and generally lies in a plane perpendicular to a central axis of the torsion spring 302. The second latching end 3022 is bent from a main body of the torsion spring 302, and extends along a direction parallel to the axis of the torsion spring 302. A diameter of the torsion spring 302 is larger than that of each of the first washer 303, the resilient rings 304, and the second washer 305. When the hinge assembly 300 is assembled, the torsion spring 302 exerts a predetermined torsion force (see below).

The first and second washers 303 and 305 are approximately ring-shaped. The first and second washers 303 and 305 define a latching hole 3031 and a latching hole 3051 respectively. Each of the latching holes 3031 and 3051 has a shape and size corresponding to the respective engaging hole 242 of the rotational base 20.

The resilient rings 304 are generally plate-shaped, and are configured to provide axial force (see below).

The limiting washer 306 is approximately ring-shaped, and defines a latching hole 3061 in a middle portion thereof. The latching hole 3061 has a shape and size corresponding to the respective engaging hole 242 of the rotational base 20. The limiting washer 306 forms a limiting block 3062 at a periphery thereof. The limiting block 3062 is generally involute relative to a main body of the limiting washer 306.

The fixing piece 307 may be a screw nut defining a thread 3071 therein, for engaging with the thread 3013 of the deformed shaft portion 3012 of the corresponding pivotal shaft 301.

The first tab washer 308 is approximately ring-shaped, and defines a round hole 3081 in a middle portion thereof. A tab 3082 is formed at a periphery of the first tab washer 308. The tab 3082 has a shape and size corresponding to a respective one of the fixing holes 1602 of the support member 10.

The second tab washer 309 is substantially the same as the first tab washer 308, and is also approximately ring-shaped. The second tab washer 309 defines a round hole 3091 in a middle portion thereof. A tab 3092 is formed at a periphery of the second tab washer 309. The tab 3092 has a shape and size corresponding to a respective one of the fixing holes 244 of the rotational base 20. The second tab washer 309 defines a plurality of evenly spaced oil holes 3093 around the round hole 3091. The oil holes 3093 are configured for storing lubricating oil.

The protecting piece 310 is configured for preventing the corresponding assembling portion 160 of the support member 10 from directly touching the corresponding side board 24 of the rotational base 20. Thereby, abrasion does not occur between the assembling portion 160 and the side board 24. A shape of the protecting piece 310 is substantially the same as that of the assembling portion 160 of the support member 10. The protecting piece 310 defines a round hole 3101 adjacent to one end thereof, and has a bending portion 3102 at an opposite end thereof. The bending portion 3102 extends toward an exterior of the hinge assembly 300, and corresponds to the respective restricting surface 1611 of the support member 10.

Each pin 40 is cylindrical, and has a circumference substantially the same as that of a corresponding one of the round holes 1612 of the support member 10.

Figure 3:
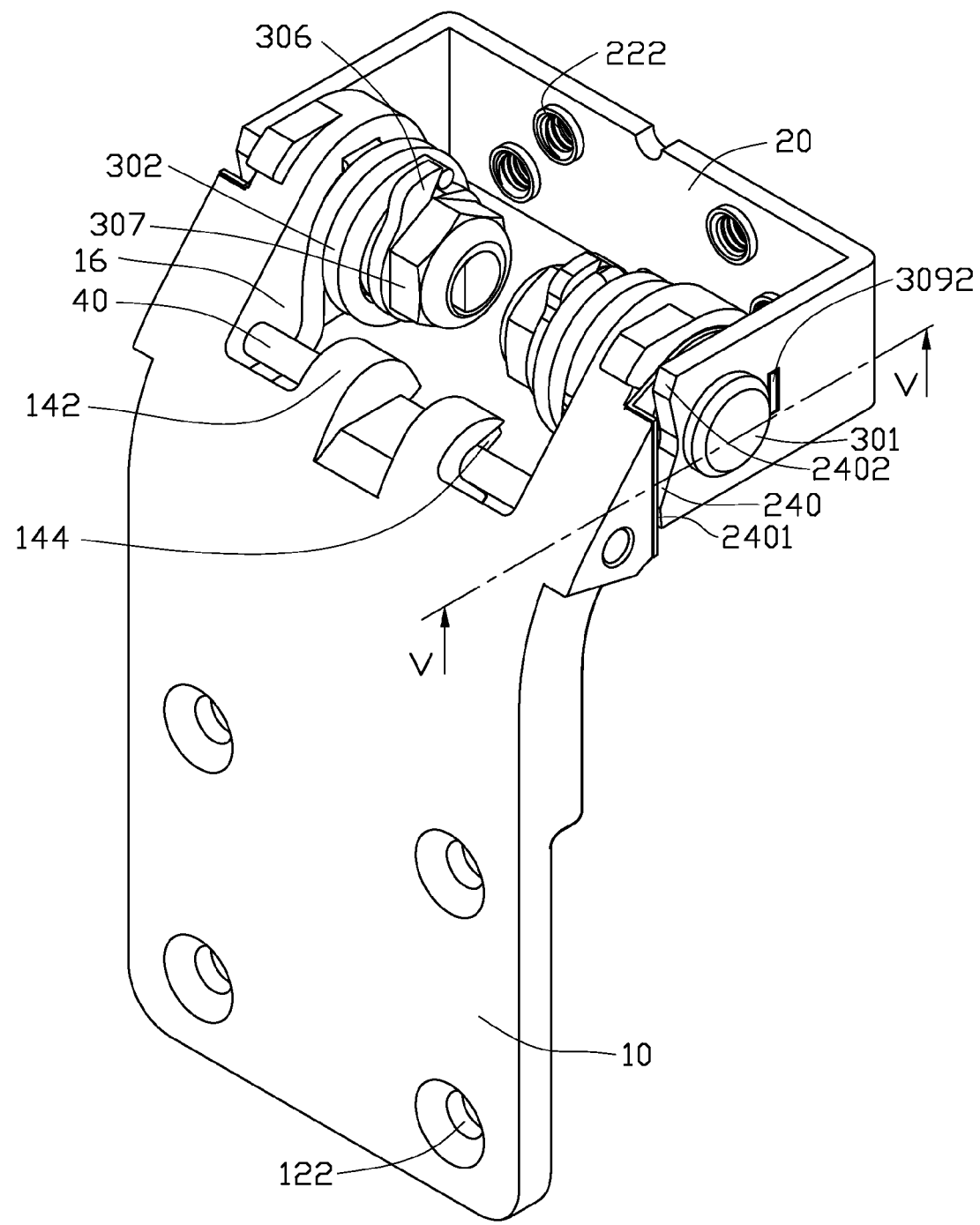
FIG. 3 is an enlarged, assembled, isometric view of the hinge assembly of FIG. 2, showing a rotational base of the hinge assembly rotated to a first utmost position.
Figure 4:
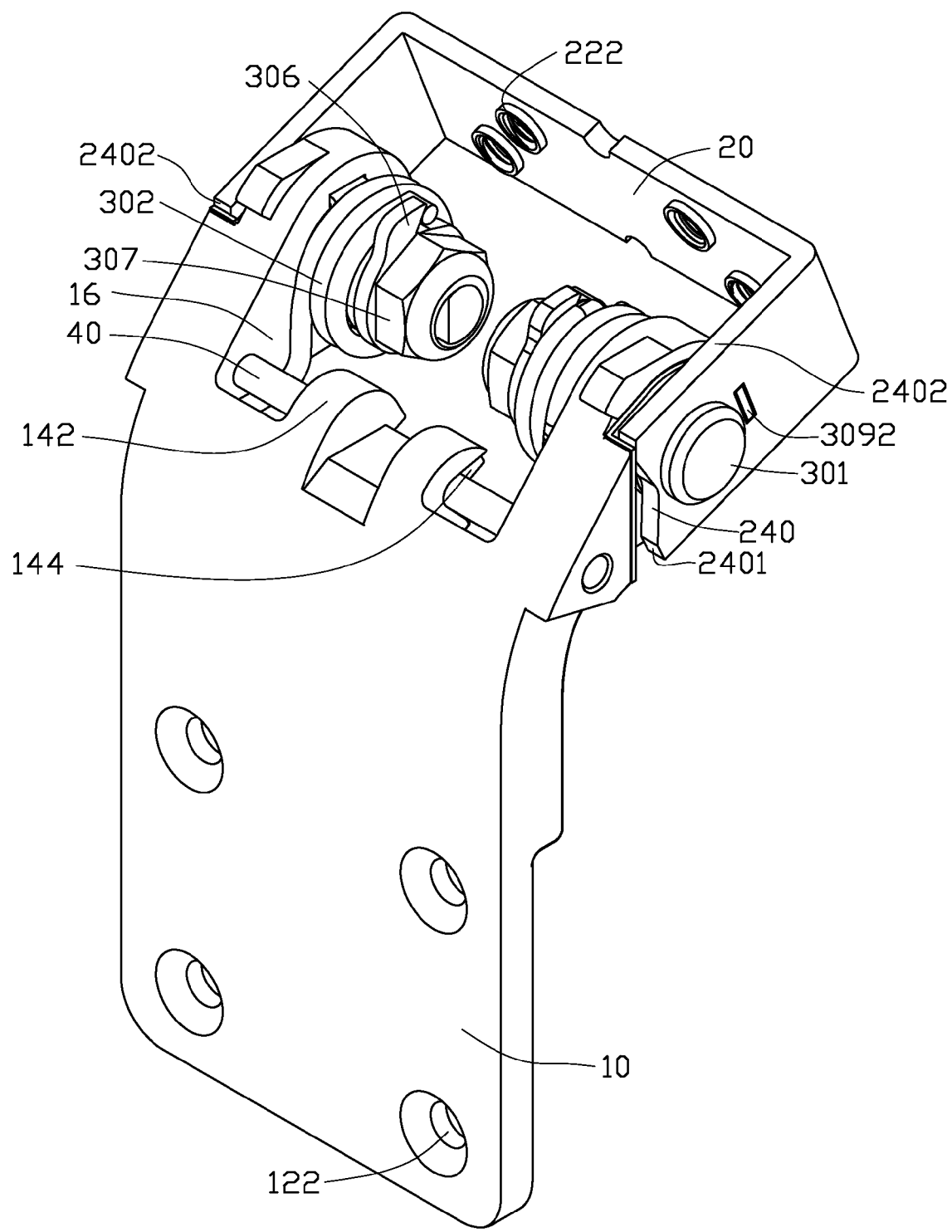
FIG. 4 is similar to FIG. 3, but showing the rotational base of the hinge assembly rotated to a second utmost position.
Figure 5:
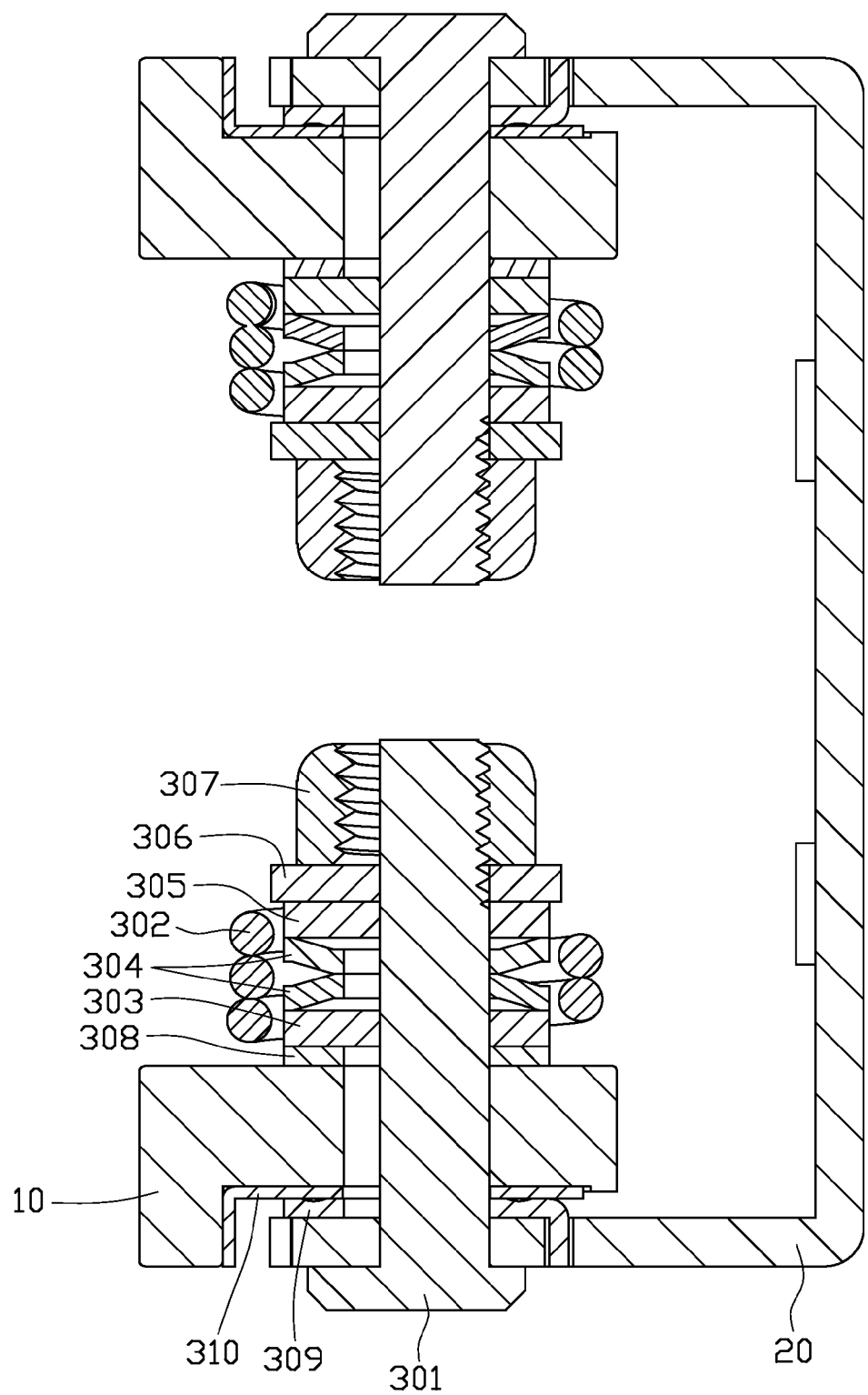
FIG. 5 is a cross-sectional view taken along line V-V of FIG. 3.

Referring to FIGS. 3-5, in assembly of each pivot mechanism 30, the pin 40 is inserted through the through hole 1612 of the support member 10. One end of the pin 40 is received in the fixing slot 144 of the support member 10. The first tab washer 308 is fixed to the support member 10, with the tab 3082 of the first tab washer 308 being received in fixing hole 1602. The second tab washer 309 is fixed to the rotational base 20, with the tab 3092 of the second tab washer 309 being received in the fixing hole 244. The protecting piece 310 is fixed to the assembling portion 160 of the support member 10. The bending portion 3102 of the protecting piece 310 abuts the restricting surface 1611 of the support member 10, so that the protecting piece 310 is non-rotatable relative to the support member 10. The rotational base 20 is positioned around the support member 10. The engaging holes 242 of the side boards 24 of the rotational base 20 are aligned with the round pivoting holes 1601 of the support member 10, with the side boards 24 of the rotational base 20 disposed at exterior sides of the extending seats 16 of the support member 10 respectively. The deformed shaft portion 3012 of one of the pivotal shafts 301 is passed through the engaging hole 242 of one side board 24 of the rotational base 20, the round hole 3091 of one second tab washer 309, the round hole 3101 of one protecting piece 310, one round pivoting hole 1601 of the support member 10, the round hole 3081 of one first tab washer 308, the latching hole 3031 of one first washer 303, one pair of the resilient rings 304, the latching hole 3051 of one second washer 305, one of the torsion springs 302, and the latching hole 3061 of one limiting washer 306, in that order. The two resilient rings 304 abut each other and are oriented symmetrically opposite to each other. The first latching end 3021 of the torsion spring 302 resists the pin 40, and the second latching end 3022 of the torsion spring 302 resists the limiting block 3062 of the limiting washer 306. The fixing piece 307 is fixed on the pivotal shaft 301 via the thread 3013. Thereby, one of the pivot mechanisms 30 is assembled. The other pivot mechanism 30 is assembled in a similar manner.

Then the hinge assembly 300 is used to assemble the flat display monitor. The support member 10 is fixed to the support body 200 by means of engagement of fasteners in the mounting holes 122. The fasteners can for example be bolts or screws. The rotational base 20 is fixed to display body 100 by means of engagement of fasteners in the threaded assembling holes 222. The fasteners can for example be bolts or screws.

In each pivot mechanism 30 of the hinge assembly 300, the first and second tab washers 308 and 309, the first and second washers 303 and 305, the two resilient rings 304, and the limiting washer 306 cooperatively maintain desired spacings between the various components of the pivot mechanism 30. In addition, the first and second tab washers 308 and 309, the first and second washers 303 and 305, the two resilient rings 304, and the limiting washer 306 together cooperatively help provide an amount of friction that allows movement of the display body 100 relative to the support body 200 upon application of a moderate force, and that also allows the display body 100 to be stably maintained in a desired position relative to the support body 200. Part of the required an amount of friction can also be obtained through the operation of the other elements of the hinge assembly 300 as well.

In use, a force is exerted on the display body 100 by a user. Because the support member 10 is fixed relative to the support body 200, the display body 100 in turn causes the rotational base 20 to move. In each pivot mechanism 30, the first and second washers 303, 305 and the limiting washer 306 also rotate together with the rotational base 20. Accordingly, the second latching end 3022 of the torsion spring 302 which resists the limiting block 3062 of the limiting washer 306 rotates, whereby the torsion force of the torsion spring 302 either increases or decreases. Supposing that the display body 100 is in an intermediate position relative to the support member 10, then the torsion force of the torsion spring 302 increases when the display body 100 rotates in a first direction generally toward the surface 120, and the torsion force of the torsion spring 302 decreases when the display body 100 rotates in a second direction opposite to the first direction. Referring to FIG. 3, when the display body 100 rotates through a determined angle in the first direction to a first utmost position, the first restricting surface 2401 of the rotational base 20 resists the bending portion 3102 at the restricting surface 1611 of the support member 10. Thereby, the display body 100 together with the rotational base 20 cannot rotate further in the first direction. Referring to FIG. 4, when the display body 100 rotates through a determined angle in the second direction to a second utmost position, the second restricting surface 2402 of the rotational base 20 resists the bending portion 3102 at the restricting surface 1611 of the support member 10. Thereby, the display body 100 together with the rotational base 20 cannot rotate further in the second direction. Thus, the hinge assembly 300 limits a maximum inclination angle of the flat display monitor in each of the first and second directions, by provision of the restricting surfaces 1611 of the support member 10. The protecting pieces 310 disposed between the support seat 10 and the rotational base 20 prevent direct abrasion between the support seat 10 and the rotational base 20, so as to prolong the useful lifetime of the hinge assembly 300.

In alternative embodiments, each of the pivotal shafts 301 can be fastened in position by means of one or more other holding members such as a rivet or a ring. For example, the fixing piece 307 and the thread 3013 of the deformed shaft portion 3012 can be replaced by a C-shaped ring and a receiving groove. Only a single pivot mechanism 30 may be provided. In such case, the above-described configurations of the extending seats 16 of the support member 10, the side boards 24 of the rotational base 20 and the pins 40 need only apply in respect of one of each of these components. The support member 10 may be a planar board only without extending seats 16. The pins 40 may be replaced by other resisting members such as bolts, or one or more protrusions formed on the rotational base 20. Other elastic members such as springs or elastic washers may replace the two resilient rings 304. The support member 10 may be mounted to the display body 100, in which case the rotational base 20 is mounted to the support body 200.

As described above, the hinge assembly 300 makes it convenient for a user to operate a device such as a flat display screen. In addition, the hinge assembly 300 is durable. It is, however, to be understood that the hinge assembly 300 can be used in other applications in which it may be desirable to allow selective pivoting of an object over a limited angular range. For example, the hinge assembly 300 may be applied in a freestanding, adjustable mirror.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A hinge assembly, comprising:
    a rotational base including a fixing board and a side board disposed at an end of the fixing board, the side board defining an engaging hole in middle portion thereof and forming an inwardly bent portion at a distal end edge thereof;
    a support member including an extending seat defining a round pivoting hole, and a retaining portion extending from a side of the extending seat, the retaining portion configured for blocking the inwardly bent portion of the side board so that a range of rotation of the rotational base relative to the support member is between a first utmost position and a second utmost position; and
    a pivot mechanism for rotatably connecting the rotational base to the support member, the pivot mechanism comprising:
        a torsion spring configured for providing torsion force;

a pivotal shaft running through the engaging hole, the torsion spring and the round pivoting hole so as to be non-rotatably connected to the rotational base and rotatably connected to the extending seat; and a fixing piece engaged on the pivotal shaft to prevent the torsion spring from disengaging from the pivotal shaft.

2. The hinge assembly as claimed in claim 1, wherein the inwardly bent portion includes a first restricting surface and a second restricting surface adjacent the first restricting surface, the retaining portion of the support member includes a third restricting surface, the first restricting surface resists the third restricting surface at the first utmost position, and the second restricting surface resists the third restricting surface at the second utmost position.

3. The hinge assembly as claimed in claim 2, wherein a protecting piece is disposed between the extending seat of the support member and the side board of the rotational base, the protecting piece defines a round hole adjacent to one end thereof and has a bending portion at an opposite end thereof, the pivotal shaft runs through the round hole, and the bending portion is configured for resisting the third restricting surface of the support member.

4. The hinge assembly as claimed in claim 1, wherein the support member includes a mounting portion and an adjacent connecting portion, the connecting portion has the extending seat, and the mounting portion defines a plurality of mounting holes.

5. The hinge assembly as claimed in claim 4, wherein the mounting portion and the connecting portion are substantially board-shaped with the connecting portion being thicker than the mounting portion.

6. The hinge assembly as claimed in claim 4, wherein the connecting portion includes a protrusion defining a fixing slot facing generally toward the mounting portion, the retaining portion of the support member defining defines a through hole, one end of a pin received in the through hole and an opposite of the pin is received in the fixing slot, a limiting washer including a limiting block at a periphery thereof is disposed between the torsion spring and the fixing piece, with the pivotal shaft running through the limiting washer such that the limiting washer is non-rotatable relative to the pivotal shaft, the torsion spring includes a first latching end resisting the pin and a second latching end resisting the limiting block of the limiting washer.

7. The hinge assembly as claimed in claim 6, wherein two washers are disposed between the extending seat of the support member and the limiting washer, each of said two washers defines a latching hole whereby each of said two washers is non-rotatable relative to the pivotal shaft, and two resilient pieces are disposed between said two washers and are configured for providing axial force along the pivot mechanism.

8. The hinge assembly as claimed in claim 6, wherein the extending seat includes an assembling portion, the assembling portion defines the pivoting hole in a middle thereof and a fixing hole in a periphery thereof, a tab washer is fixed to the support member, the tab washer includes a tab and a round hole, the tab is received in the fixing hole, and the pivotal shaft extends through the pivoting hole of the assembling portion and the round hole of the tab washer.

9. The hinge assembly as claimed in claim 6, wherein the side board of the rotational base also defines a fixing hole adjacent to the engaging hole, a tab washer is fixed to the side board, the tab washer includes a tab and defines a round hole, the tab is received in the fixing hole of the rotational base, and the pivotal shaft extends through the round hole of the tab washer.

10. The hinge assembly as claimed in claim 9, wherein the tab washer defines a plurality of lubricant holes around the round hole.

11. The hinge assembly as claimed in claim 1, wherein the pivotal shaft includes a flange and a deformed shaft portion, the flange is at one end of the pivotal shaft and the deformed shaft portion is at an opposite end of the pivotal shaft, and the deformed shaft portion has a flat surface such that a keyed cross-section of the deformed shaft portion corresponds to a keyed shape and a size of the engaging hole of the rotational base.

12. The hinge assembly as claimed in claim 11, wherein the deformed shaft portion of the pivotal shaft defines a screw thread on an end thereof distal from the flange, and the fixing piece includes a screw thread engaged with the screw thread of the pivotal shaft.

13. A display monitor comprising:
a display body;
a support body; and
a hinge assembly including a support member fixed to the support body, a rotational base fixed to the display body, and a pivot mechanism rotatably interconnecting the rotational base and the support member, the rotational base including a fixing board and a side board disposed at an end of the fixing board, the side board defining an engaging hole and forming an inwardly bent portion at a distal end edge thereof the support member including an extending seat defining a round pivoting hole, and a retaining portion extending from a side of the extending seat, the retaining portion configured for blocking the inwardly bent portion of the side board so that the rotational base together with the display body has a limited range of rotation between a first utmost position and a second utmost position;
wherein the pivot mechanism comprises a torsion spring residing between the support member and the rotational base configured for providing a torsion force, a pivotal shaft running through the engaging hole, the torsion spring and the round pivoting hole so as to be non-rotatably connected to the rotational base and rotatably connected to the rotational base, and a fixing piece engaged on the pivotal shaft to prevent the torsion spring from disengaging from the pivotal shaft.

14. The display monitor as claimed in claim 13, wherein the inwardly bent portion includes a first restricting surface and a second restricting surface adjacent the first restricting surface, the retaining portion of the support member includes a third restricting surface, the first restricting surface resists the third restricting surface at the first utmost position, the second restricting surface resists the third restricting surface at the second utmost position.

15. The display monitor as claimed in claim 14, wherein a protecting piece is disposed between the extending seat of the support member and the side board of the rotational base, the protecting piece defines a round hole adjacent to one end thereof, and has a bending portion at an opposite end thereof, the pivotal shaft runs through the round hole, and the bent portion is configured for resisting the third restricting surface of the support member.

16. The display monitor as claimed in claim 13, wherein the support member includes a mounting portion and an adjacent connecting portion, the connecting portion has the extending seat, and the mounting portion defines a plurality of mounting holes.

17. The display monitor as claimed in claim 16, wherein the connecting portion includes a protrusion defining a fixing slot facing generally toward the mounting portion, the retaining portion of the support member defining defines a through hole, one end of a pin received in the through hole and an opposite of the pin is received in the fixing slot, a limiting washer including a limiting block at a periphery thereof is disposed between the torsion spring and the fixing piece, with the pivotal shaft running though the limiting washer such that the limiting washer is non-rotatable relative to the pivotal shaft, the round hole, the torsion spring includes a first latching end resisting the pin and a second latching end resisting the limiting block of the limiting washer.

18. The display monitor as claimed in claim 17, wherein two washers are disposed between the extending seat of the support member and the limiting washer, each of said two washers define a latching hole whereby each of said two washers is non-rotatable relative to the pivotal shaft, and two resilient pieces are disposed between said and are configured for two washers for providing an axial force along the pivot mechanism.

19. The display monitor as claimed in claim 16, wherein the extending seat includes a assembling portion, the assembling portion defines the round pivoting hole in a middle of and a fixing hole in a periphery thereof, a first tab washer is fixed to the support member, the first tab washer includes a tab and defines a round hole, the tab of the first tab is received in the fixing hole, and the pivotal shaft extends the pivoting hole of the assembling portion and the round hole of the tab first washer, and the tab is received in the fixing hole, the side board also defines an a fixing hole adjacent to the engaging hole, a second tab washer is fixed to the side board of the rotational base, the second tab washer includes a tab and defines a round hole, the tab of the second tab washer is received in the fixing hole of the rotational base, and the pivotal shaft extends through the round hole of the second tab washer.

\* \* \* \* \*